(12) United States Patent
Yoshida et al.

(10) Patent No.: US 10,886,678 B2
(45) Date of Patent: Jan. 5, 2021

(54) GROUND CONNECTION STRUCTURE OF ELECTRICAL CONNECTION BOX AND FIXATION OBJECT AND ELECTRICAL CONNECTION BOX

(71) Applicant: Yazaki Corporation, Tokyo (JP)

(72) Inventors: Naoyuki Yoshida, Makinohara (JP); Jin Watanabe, Makinohara (JP); Shouya Shinogaya, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/571,389

(22) Filed: Sep. 16, 2019

(65) Prior Publication Data

US 2020/0136325 A1 Apr. 30, 2020

(30) Foreign Application Priority Data

Oct. 29, 2018 (JP) .................................. 2018-203144

(51) Int. Cl.
*H01R 24/68* (2011.01)
*H01R 4/30* (2006.01)
*H01R 13/627* (2006.01)
*B60R 16/023* (2006.01)
*H01R 13/20* (2006.01)
*H01R 101/00* (2006.01)

(52) U.S. Cl.
CPC ......... *H01R 24/68* (2013.01); *B60R 16/0238* (2013.01); *H01R 4/304* (2013.01); *H01R 13/20* (2013.01); *H01R 13/6273* (2013.01); *H01R 2101/00* (2013.01); *H01R 2201/26* (2013.01)

(58) Field of Classification Search
CPC ....... H01R 13/648–655; H01R 13/6582–6584; H01R 13/6273; H01R 13/20; H01R 24/68; H01R 4/304; H01R 2201/26; H01R 2101/00; B60R 16/0238
USPC ................ 439/607.17–607.19, 607.28–607.3
See application file for complete search history.

(56) References Cited

U.S. PATENT DOCUMENTS

| 6,007,351 A * | 12/1999 | Gabrisko, Jr. ....... | H05K 9/0018 439/76.2 |
| 7,874,851 B2 * | 1/2011 | Shimizu .................. | H01R 4/34 439/620.21 |
| 8,197,285 B2 * | 6/2012 | Farmer ................ | H01R 12/712 439/607.3 |

(Continued)

FOREIGN PATENT DOCUMENTS

| CN | 103002650 A | 3/2013 |
| JP | 63-464 U | 1/1988 |

(Continued)

*Primary Examiner* — Gary F Paumen
(74) *Attorney, Agent, or Firm* — Sughrue Mion, PLLC (57) ABSTRACT

A ground connection structure for an electrical connection box and a fixation object, includes a first ground contact portion provided on the fixation object, a second ground contact portion provided on the electrical connection box and electrically connected to the first ground contact portion when the electrical connection box is fixed to the fixation object, a ground circuit body provided in the electrical connection box and electrically connected to the second ground contact portion, and a fixing member configured to fix the electrical connection box to the fixation object such that the second ground contact portion is brought into contact with the first ground contact portion.

8 Claims, 5 Drawing Sheets

(56) References Cited

U.S. PATENT DOCUMENTS

| | | | | |
|---|---|---|---|---|
| 8,724,343 | B2* | 5/2014 | Feldstein | H05K 9/0058 |
| | | | | 361/616 |
| 8,992,249 | B2* | 3/2015 | Kobayashi | H01R 13/6591 |
| | | | | 439/362 |
| 2001/0016453 | A1* | 8/2001 | Casey | H01R 13/6272 |
| | | | | 439/607.28 |
| 2002/0009909 | A1* | 1/2002 | Kondoh | H01R 31/08 |
| | | | | 439/92 |
| 2002/0081876 | A1* | 6/2002 | Modina | H01R 4/305 |
| | | | | 439/92 |
| 2013/0063906 | A1 | 3/2013 | Chen et al. | |
| 2013/0084743 | A1* | 4/2013 | Adachi | H01R 13/6596 |
| | | | | 439/607.28 |
| 2014/0285986 | A1 | 9/2014 | Sano | |
| 2015/0311644 | A1* | 10/2015 | Yang | H01R 13/6593 |
| | | | | 439/607.28 |

FOREIGN PATENT DOCUMENTS

| | | |
|---|---|---|
| JP | 9-199209 A | 7/1997 |
| JP | 10-270889 A | 10/1998 |
| JP | 2002-141690 A | 5/2002 |
| JP | 2009-95195 A | 4/2009 |
| JP | 2013-226019 A | 10/2013 |
| JP | 2014-187313 A | 10/2014 |

* cited by examiner

GROUND CONNECTION STRUCTURE OF ELECTRICAL CONNECTION BOX AND FIXATION OBJECT AND ELECTRICAL CONNECTION BOX

CROSS REFERENCE TO RELATED APPLICATIONS

This application is based on Japanese Patent Application (No. 2018-203144) filed on Oct. 29, 2018, the contents of which are incorporated herein by reference.

BACKGROUND OF THE INVENTION

1. Field of the Invention

The present invention relates to a ground connection structure for an electrical connection box mounted on a vehicle, and the electrical connection box.

2. Description of the Related Art

An electrical connection box for connecting a battery and various electric devices is mounted on a vehicle (see JP-A-2013-226019, for example). The electrical connection box is equipped with a circuit board, a bus bar, or the like serving as an electric circuit body. The circuit board and the bus bar are provided with grounding conductor portions.

The grounding conductor portions are connected in an appropriately integrated form, mostly to a ground point outside the electrical connection box, using a conductor wire such as an electric wire. Alternatively, a ground circuit is incorporated in a connector on an electrical connection box side, and a grounding conductor portion is grounded through a grounding circuit of a mating connector.

A ground connection completed by preparing a conductor wire such as an electric wire separately from the electrical connection box or incorporating the ground circuit to the connector makes it easy to increase the number of man-hours in each process of design, manufacture and assembly, and as a result, cost tends to be high.

SUMMARY OF THE INVENTION

The present invention has been made in view of the above circumstances, and an object thereof is provided a ground connection structure of an electrical connection box and the electrical connection box which can perform a ground connection of an electric circuit body simply by attaching the electrical connection box to a vehicle body as a fixation object, thereby omitting a grounding conductor wire, reducing the number of man-hours in each process of design, manufacture and assembly and reducing cost.

In order to achieve the above object, the ground connection structure of the electrical connection box and the electrical connection box according to the present invention are characterized by the following (1) to (9).

(1) A ground connection structure of an electrical connection box and a fixation object, the ground connection structure including:
 a first ground contact portion provided on the fixation object;
 a second ground contact portion provided on the electrical connection box and electrically connected to the first ground contact portion when the electrical connection box is fixed to the fixation object;
 a ground circuit body provided in the electrical connection box and electrically connected to the second ground contact portion; and
 a fixing member configured to fix the electrical connection box to the fixation object such that the second ground contact portion is brought into contact with the first ground contact portion.

(2) The ground connection structure according to the above configuration (1),
 in which the fixation object is a vehicle body made of metal, and a surface of the vehicle body is the first ground contact portion; and
 in which the second ground contact portion has a flat plate shape and is in surface contact with the surface of the vehicle body.

(3) The ground connection structure according to the above configuration (2),
 in which a plurality of protrusions are provided on a contact surface of the second ground contact portion configured to be in surface contact with the first ground contact portion.

(4) The ground connection structure according to any one of the above configurations (1) to (3), further including:
 an elastic member configured to press into contact the second ground contact portion with the first ground contact portion by an elastic force of the elastic member.

(5) The ground connection structure according to c the above configuration (1),
 in which the fixing member includes:
  an engagement hole formed through a fixing plate of the fixation object; and
  a flexible engagement hook of the electrical connection box elastically engaged with the engagement hole when the flexible engagement hook is inserted into the engagement hole;
 in which the engagement hook includes:
  a deflectable arm; and
  a locking protrusion provided on an end of the deflectable arm and protruding toward a side surface of the arm in a bending direction of the deflectable arm which is orthogonal to an insertion direction of the flexible engagement hook with respect to the engagement hole when the engagement hook is inserted into the engagement hole, the locking protrusion being engaged with a hole edge of the engagement hole by an elastic restoration action of the engagement hook;
 in which the first ground contact portion is provided on a hole wall of the engagement hole which is engaged with the locking protrusion; and
 in which the second ground contact portion is provided on a side surface of the arm of the engagement hook which faces in a protruding direction of the locking protrusion.

(6) The ground connection structure according to the above configuration (1),
 in which the fixing member includes:
  an engagement hole formed through a fixing plate of the fixation object; and
  a flexible engagement hook of the electrical connection box elastically engaged with the engagement hole when the flexible engagement hook is inserted into the engagement hole; and
 in which the engagement hook has a first engagement hook portion made of metal and a second engagement hook portion made of resin which are inserted into the engagement hole and are provided parallel to each other;

in which locking protrusions are provided on ends of deflectable arms of the first engagement hook portion and the second engagement hook portion respectively, the locking protrusions protrude respectively in directions opposite to the opposed sides of the arms in bending directions of the arms of the first and second engagement hook portions which are orthogonal to an insertion direction of the first and second engagement hook portions with respect to the engagement hole, and when the first and second engagement hook portions are inserted into the engagement hole, the locking protrusions are engaged with opposing hole edges of the engagement hole by elastic restoration actions of the first and second engagement hook portions; and in which a side surface of the first engagement hook portion is electrically connected to the first ground contact portion provided on a hole wall of the engagement hole of a fixing plate as the second ground contact portion.

(7) An electrical connection box comprising:

a second ground contact portion configured to be electrically connected to a first ground contact portion provided on a fixation object;

a ground circuit body electrically connected to the second ground contact portion; and a fixing member configured to fix the electrical connection box to the fixation object such that the second ground contact portion is brought into contact with the first ground contact portion, in which the second ground contact portion has a flat plate shape and is in surface contact with the first ground contact portion; and in which a plurality of protrusions are provided on a contact surface of the second ground contact portion which is in surface contact with the first ground contact portion.

(8) An electrical connection box comprising:

a second ground contact portion configured to be electrically connected to a first ground contact portion provided on a fixation object;

a ground circuit body electrically connected to the second around contact portion; and a fixing member configured to fix the electrical connection box to the fixation object such that the second ground contact portion is brought into contact with the first ground contact portion, in which the fixing member has a flexible engagement hook which is inserted into the engagement hole of a fixing plate of the fixation object and is elastically engaged with the engagement hole;

in which the engagement hook includes:

a deflectable arm; and a locking protrusion provided on an end of the deflectable arm and protruding toward a side surface of the arm in a bending direction of the deflectable arm which is orthogonal to an insertion direction of the flexible engagement hook with respect to the engagement hole; and in which the second ground contact portion is provided on a side surface of the arm of the engagement hook which faces in a protruding direction of the locking protrusion.

(9) An electrical connection box comprising:

a second ground contact portion configured to be electrically connected to a first ground contact portion provided on a fixation object;

a ground circuit body electrically connected to the second ground contact portion; and a fixing member configured to fix the electrical connection box to the fixation object such that the second ground contact portion is brought into contact with the first ground contact portion, in which the fixing member has a flexible engagement hook which is inserted into an engagement hole of a fixing plate of the fixation object and which is elastically engaged with the engagement hole;

in which the engagement hook has a first engagement hook portion made of metal and a second engagement hook portion made of resin which are inserted into the engagement hole and are provided parallel to each other;

in which locking protrusions are provided on ends of deflectable arms of the first engagement hook portion and the second engagement hook portion respectively, the locking protrusions protrude respectively in directions opposite to the opposed sides of the arms in bending directions of the arms of the first and second engagement hook portions; and in which a side surface of the first engagement hook portion in the bending direction serves as the second ground contact portion and is electrically connected to the first ground contact portion.

According to the ground connection structure having the above configuration (1), the second ground contact portion on the electrical connection box side can be brought into contact and conducted with the first ground contact portion on a fixation object side by simply fixing the electrical connection box to a fixed position of the fixation object with the fixing member. Therefore, a ground connection of the ground circuit body of the electrical connection box can be completed simply by fixing the electrical connection box with the fixing member. A conductor wire such as a grounding electric wire can be omitted, and a troublesome configuration such as providing a ground circuit in a connector can be avoided. As a result, the number of man-hours in each process of design, manufacture and assembly can be reduced so as to reduce cost. In addition, since a connection between the second ground contact portion and the ground circuit body in the electrical connection box can be performed in any shortest path, a use amount of a conductor (metal) can be reduced as compared with a case of a ground connection through a mounting bolt of a fixing bracket.

According to the ground connection structure having the above configuration (2), the flat plate as the second ground contact portion on the electrical connection box can be reliably brought into surface contact with the surface of the vehicle body which is the first ground contact portion by fixing the electrical connection box to the vehicle body which is the fixation object with the fixing member, so that the ground connection can be completed. Here, a contact direction of the second ground contact portion with respect to the surface of the vehicle body, which is the first ground contact portion, is set as a fixing direction of the electrical connection box. Therefore, by simply fixing the electrical connection box to the vehicle body with the fixing member, the entire surface of the flat plate as the second ground contact portion can be reliably brought into surface contact with the surface of the vehicle body in a stable posture, and a good ground connection performance can be obtained.

According to the ground connection structure having the above configuration (3), a plurality of protrusions are formed on the contact surface of the second ground contact portion on the electrical connection box side. Therefore, the second ground contact portion can be reliably brought into contact and conducted with a metal portion inside while piercing a surface layer such as a coating or an insulating film of the surface of the vehicle body with the protrusions, and a good ground connection performance can be obtained.

According to the ground connection structure having the above configuration (4), since the second ground contact portion is pressed into contact with the first ground contact portion by an elastic force of the elastic member, for example, a spring, a better conduction state can be ensured.

According to the ground connection structure having the above configuration (5), the electrical connection box can be fixed to the fixing plate simply by inserting the engagement hook on the electrical connection box side into the engagement hole of the fixing plate which is the fixation object without using a bolt or the like. Moreover, simultaneously with the fixing, the second ground contact portion can be reliably brought into contact and conducted with the first ground contact portion while using an elastic force of the engagement hook. Therefore, since a bolt or the like is not used, the fixing and the ground connection can be easily completed, and it is particularly advantageous to apply to a small electrical connection box.

According to the ground connection structure having the above configuration (6), the electrical connection box can be fixed to the fixing plate simply by inserting the engagement hooks made of metal and resin into the engagement hole of the fixing plate which is the fixation object without using a bolt or the like. In this case, since the locking protrusions of the two engagement hooks engage with the opposing hole edges of the engagement hole of the fixing plate, the electrical connection box can be firmly fixed to the fixing plate without a backlash. In addition, simultaneously with the fixing, the side surface (second ground contact portion) of the engagement hook made of metal can be reliably brought into contact and conducted with the first ground contact portion while using two elastic forces of the engagement hook made of metal and the engagement hook made of resin. Therefore, the fixing and the ground connection can be easily completed without using a bolt or the like, and it is particularly advantageous to apply to a small electrical connection box.

According to the electrical connection box having the above configuration (7), the flat plate shaped second ground contact portion can be reliably brought into surface contact with the surface of the vehicle body which is the first ground contact portion by fixing the electrical connection box to the vehicle body which is the fixation object with the fixing member, so that the ground connection can be completed. A plurality of protrusions are formed on the contact surface of the second ground contact portion of the electrical connection box. Therefore, the second ground contact portion can be reliably brought into contact and conducted with a metal portion inside while piercing a surface layer such as a coating or an insulating film of the surface of the vehicle body with the protrusions, and a good ground connection performance can be obtained.

According to the electrical connection box having the above configuration (8), the electrical connection box can be fixed to the fixing plate simply by inserting the engagement hook of the electrical connection box into the engagement hole of the fixing plate which is the fixation object without using a bolt or the like. Moreover, simultaneously with the fixing, the second ground contact portion can be reliably brought into contact and conducted with the first ground contact portion while using an elastic force of the engagement hook.

According to the electrical connection box having the above configuration (9), the electrical connection box can be fixed to the fixing plate simply by inserting the engagement hooks made of metal and resin into the engagement hole of the fixing plate which is the fixation object without using a bolt or the like. In this case, since the locking protrusions of the first and second engagement hook portions engage with the opposing hole edges of the engagement hole of the fixing plate, the electrical connection box can be firmly fixed to the fixing plate without a backlash. In addition, simultaneously with the fixing, the side surface (second ground contact portion) of the first engagement hook portion made of metal can be reliably brought into contact and conducted with the first ground contact portion while using two elastic forces of the first engagement hook portion made of metal and the second engagement hook portion made of resin.

According to the present invention, the ground connection of the ground circuit body of the electrical connection box can be completed simply by fixing the electrical connection box with the fixing member. The conductor wire such as a grounding electric wire can be omitted, and the troublesome configuration such as providing a ground circuit in the connector can be avoided. As a result, the number of man-hours in each process of design, manufacture and assembly can be reduced so as to reduce cost.

The present invention has been briefly described above. Details of the present invention will be further clarified by reading a mode (hereinafter, referred to as "embodiment") for carrying out the invention to be described below with reference to the accompanying drawings.

BRIEF DESCRIPTION OF DRAWINGS

FIGS. 4A and 4B are explanatory views of the ground connection structure of the electrical connection box according to the second embodiment of the present invention, in which

DETAILED DESCRIPTION OF THE EXEMPLARY EMBODIMENTS

A specific embodiment according to the present invention will be described below with reference to the drawings.

First Embodiment

Figure 1:
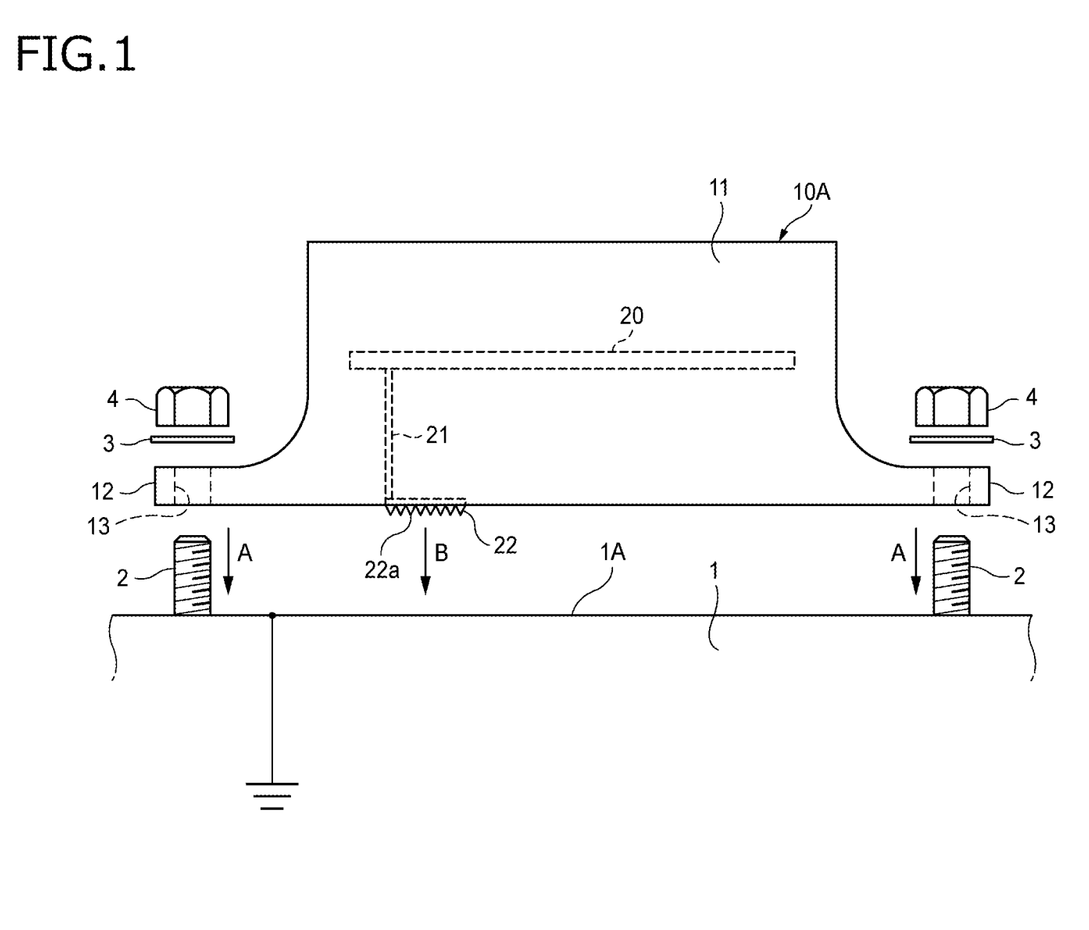
FIG. 1 is a side view showing a state before a ground connection structure of an electrical connection box according to a first embodiment of the present invention is fixed.

FIG. 1 is a side view showing a state before a ground connection structure of an electrical connection box according to a first embodiment of the present invention is fixed.

As shown in FIG. 1, a fixation object of an electrical connection box 10A of the present embodiment is a vehicle body (body) 1 made of metal. The vehicle body 1 is a good conductor, and itself is treated as a ground level. Therefore, a surface (fixed position) 1A of the vehicle body 1 to which the electrical connection box 10A is fixed corresponds to a ground plane. Here, the entire surface 1A of the vehicle body at the fixed position serves as a first ground contact portion. Stud bolts 2 for fixing the electrical connection box 10A are provided on the vehicle body 1.

One electrical connection box 10A has an electrical connection box main body 11 made of resin. Although not shown, an electrical component (such as a relay or a fuse) or an electric circuit body (a circuit board, a bus bar, or the like) is mounted on the electrical connection box main body 11. In addition, a ground circuit body 20 such as a bus bar is provided at a necessary position. The ground circuit body 20 needs to be ground-connected to the vehicle body 1.

Therefore, a second ground contact portion 22 for ground-connecting to the vehicle body 1 is provided on a bottom surface of the electrical connection box main body 11. The bottom surface of the electrical connection box main body 11 is a portion against which abuts the surface 1A of the vehicle body 1 is abutted when the electrical connection box 10A is fixed to the vehicle body 1, and the second ground contact portion 22 is provided exposed on the bottom surface. The second ground contact portion 22 is formed of a flat plate, and protrudes slightly downward from the bottom surface of the electrical connection box main body 11 so as to ensure surface contact with the surface 1A (first ground contact portion) of the vehicle body 1 when the electrical connection box 10A is fixed. The second ground contact portion 22 is electrically connected to the ground circuit body 20 via a connection conductor 21.

Fixing brackets 12 made of resin are extended to lower lateral sides of the electrical connection box main body 11. A bolt through hole 13 is formed through each of the fixing brackets 12. The stud bolts 2 are passed through the bolt through holes 13, and nuts 4 are screwed and tightened into the stud bolts 2 through washers 3 from above the fixing brackets 12, so that the electrical connection box 10A is fixed to the vehicle body 1. Here, the stud bolts 2, the fixing brackets 12, the nuts 4, or the like correspond to a fixing member.

A fixing direction A of the electrical connection box 10A is an axial direction of each of the stud bolts 2, that is, a direction perpendicular to the surface 1A of the vehicle body 1. Therefore, a contact direction B in which the second ground contact portion 22 is brought into surface contact with the surface 1A of the vehicle body 1 is set in accordance with the fixing direction A. That is, a contact surface of the second ground contact portion 22 made of the flat plate with respect to the vehicle body 1 is set as a plane parallel to the surface 1A of the vehicle body 1.

In order to fix the electrical connection box 10A to the vehicle body 1, the stud bolts 2 are passed through the bolt through holes 13 of the fixing brackets 12, and the bottom surface of the electrical connection box 10A is abutted against the surface 1A of the vehicle body 1. Further, in this state, the nuts 4 are screwed and tightened to the stud bolts 2 through the washers 3 from above the fixing brackets 12, respectively. In such a manner, the electrical connection box 10A can be fixed to the vehicle body 1 while pressing the bottom surface of the electrical connection box 10A against the surface 1A of the vehicle body 1.

When fixed in this manner, the second ground contact portion 22 on the bottom surface of the electrical connection box 10A is brought into surface contact with the surface 1A (first ground contact portion) of the vehicle body 1. Accordingly, the second ground contact portion 22 and the vehicle body 1 can be brought into contact and conducted with each other. Here, by fixing the electrical connection box 10A to the vehicle body 1 against an elastic reaction force of a support structure of the second ground contact portion 22, the second ground contact portion 22 can be strongly pressed into contact with the surface 1A (first ground contact portion) of the vehicle body 1.

The second ground contact portion 22 on an electrical connection box 10A side is formed of the flat plate. Moreover, the contact direction B of the second ground contact portion 22 with respect to the surface 1A (first ground contact portion) of the vehicle body 1 is aligned with the fixing direction A of the electrical connection box 10A. Therefore, by simply fixing the electrical connection box 10A to the vehicle body 1, the entire surface of the second ground contact portion 22 formed of the flat plate can be reliably brought into surface contact with the surface 1A (first ground contact portion) of the vehicle body 1 in a stable posture. Therefore, a good contact conduction state can be obtained, and the ground circuit body 20 of the electrical connection box 10A can be electrically connected to the vehicle body 1.

A ground connection of the ground circuit body 20 of the electrical connection box 10A can be completed by simply fixing the electrical connection box 10A to the vehicle body 1. Therefore, a conductor wire such as a grounding electric wire can be omitted, and a troublesome configuration such as providing a ground circuit in a connector can be avoided. As a result, the number of man-hours in each process of design, manufacture and assembly can be reduced so as to reduce cost.

Since the connection between the second ground contact portion 22 and the ground circuit body 20 in the electrical connection box 10A can be performed in any shortest path, a use amount of unnecessary conductors (metal) can be reduced as compared with a case of a ground connection through a mounting bolt (stud bolt 2) of the fixing bracket 12. That is, in a case of the ground connection through the mounting bolt (stud bolt 2) of the fixing bracket 12, it is necessary to extend the connection conductor from the ground circuit body 20 to the bolt through hole 13. However, in the present embodiment, since the shortest path is sufficient only by extending the connection conductor 21 to the second ground contact portion 22 on the bottom surface of the electrical connection box 10A, the use amount of the conductor can be reduced.

A large number of protrusions such as fine protrusions 22a are formed on the contact surface of the second ground contact portion 22 formed as the flat plate with respect to the vehicle body 1. Accordingly, the second ground contact portion 22 can be reliably brought into contact and conducted with a metal portion inside while piercing a surface layer such as a coating or an insulating film of the surface 1A of the vehicle body 1 with the fine protrusions 22a. Therefore, a better ground connection performance can be obtained.

The second ground contact portion 22 configured as the flat plate may be biased toward a vehicle body 1 side by a force of a spring (not shown). In this case, the second ground contact portion 22 can be pressed into contact with the surface 1A (first ground contact portion) of the vehicle body 1 with an elastic force, and a better conduction state can be ensured. The spring may be formed of metal integrally with the second ground contact portion 22, or may be formed of another resin.

Second Embodiment

Figure 2:
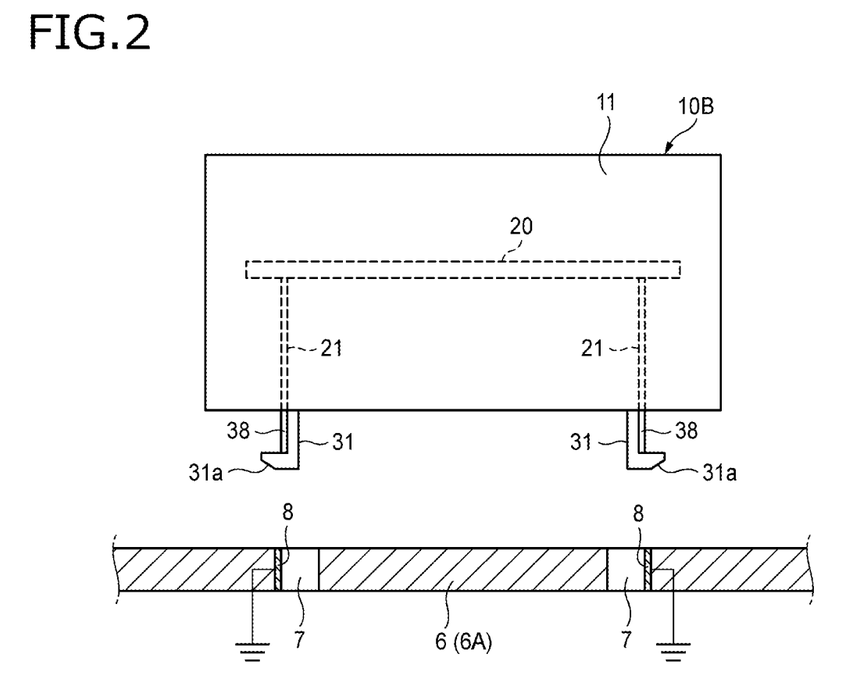
FIG. 2 is a side sectional view showing a state before a ground connection structure of an electrical connection box according to a second embodiment of the present invention is fixed.
Figure 3:
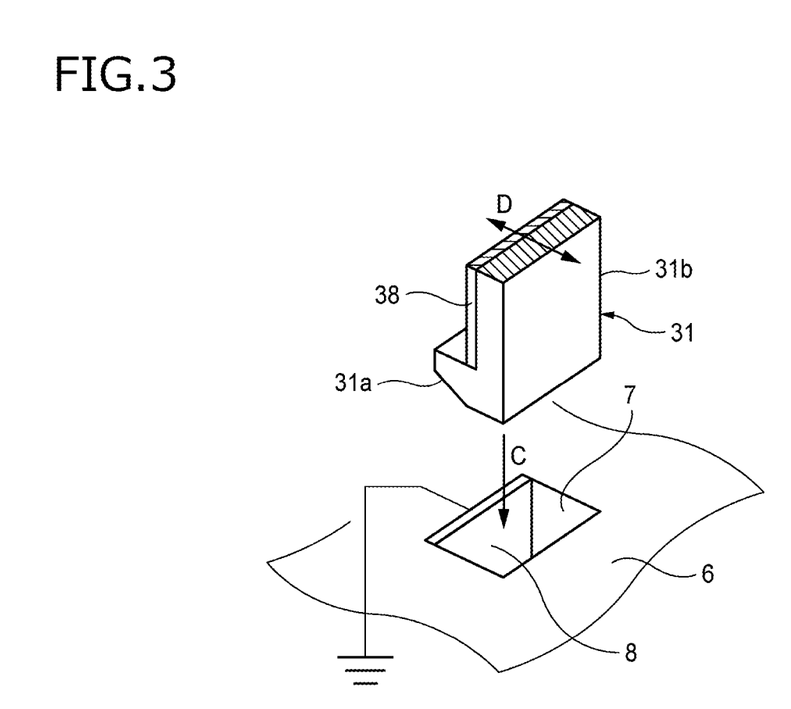
FIG. 3 is a perspective view showing a configuration of a main part of FIG. 2.
Figure 4A:
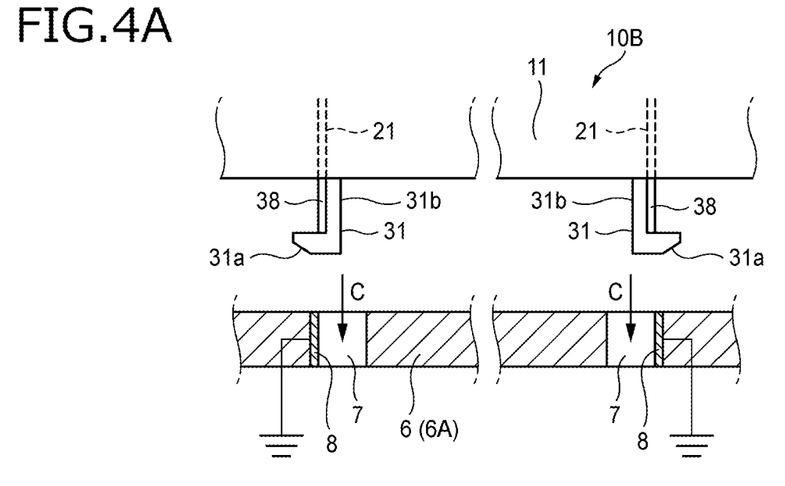
FIG. 4A is a side sectional view showing the state before the ground connection structure of the electrical connection box is fixed.
Figure 4B:
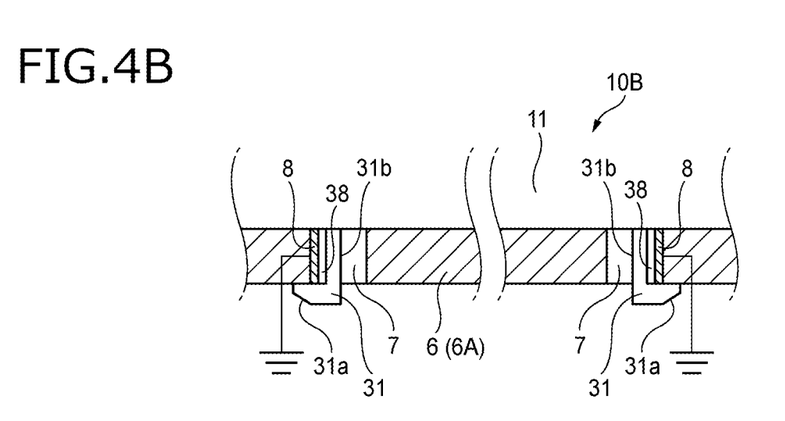
FIG. 4B is a side sectional view showing a state after the ground connection structure of the electrical connection box is fixed.

FIG. 2 is a side sectional view showing a state before a ground connection structure of an electrical connection box according to a second embodiment of the present invention is fixed, and FIG. 3 is a perspective view showing a configuration of a main part of FIG. 2. In addition, FIGS. 4A and 4B are explanatory views of the ground connection structure of the electrical connection box according to the second embodiment of the present invention, in which FIG. 4A is a side sectional view showing the state before the ground connection structure of the electrical connection box is fixed, and FIG. 4B is a side sectional view showing a state after the ground connection structure of the electrical connection box is fixed.

As shown in FIG. 2, in the ground connection structure of the electrical connection box according to the second embodiment, an electrical connection box 10B is not fixed by a bolt, but is fixed by engagement hooks 31. In addition, the fixation object is not the vehicle body made of metal but is a fixing plate 6 made of resin. Therefore, the electrical connection box 10B is not provided with the fixing bracket.

Each of the engagement hook 31 is made of resin and protruded integrally on a lower surface of the electrical connection box main body 11. In this embodiment, a fixing member of the electrical connection box 10B is configured by a combination of engagement holes 7 formed through a fixed position 6A of the fixing plate 6 and the engagement hooks 31 elastically engaged with engagement holes 7 by being inserted into the engagement holes 7.

As also shown in FIG. 3, the engagement hook 31 has a flexibility, and includes, on an end of a deflectable arm 31b, a locking protrusion 31a protruding toward a side surface of the arm 31b in a bending direction D which is a direction orthogonal to an insertion direction C with respect to the engagement hole 7. The engagement hook 31 is inserted into the engagement hole 7 so that the locking protrusion 31a is engaged with a hole edge of the engagement hole 7 by an elastic restoration action of the engagement hook 31.

As shown in FIGS. 4A and 4B, the plurality of engagement hooks 31 are provided so as to form a pair, and protruding directions of the locking protrusions 31a of the pair of engagement hooks 31 are reversed.

Second ground contact portions 38 and first ground contact portions 8 are provided in the engagement hooks 31 and the engagement holes 7 as the fixing member, respectively. The second ground contact portion 38 is provided on a side surface of the arm 31b of the engagement hook 31 on a locking protrusion 31a side. The second ground contact portions 38 are connected to the ground circuit body 20 of the electrical connection box 10B via the connection conductors 21.

Each of the first ground contact portions 8 is provided on a hole wall on a side on which the locking protrusion 31a is engaged in the hole walls of the engagement hole 7 on a fixing plate 6 side. The first ground contact portion 8 is ground-connected at any portion on the vehicle body side.

In order to fix the electrical connection box 10B to the fixing plate 6, as shown by arrows C in FIG. 4A, the engagement hooks 31 on the bottom surface of the electrical connection box 10B are inserted into the engagement holes 7 of the fixing plate 6, respectively. Then, as the insertion proceeds, tip ends of the engagement hooks 31 interfere with the hole edges of the engagement holes 7, so that the arms 31b of the engagement hooks 31 are bent to sides opposite to the protruding directions of the locking protrusions 31a. When the engagement hooks 31 are further inserted, as shown in FIG. 4B, the locking protrusions 31a come off a back side of the fixing plate 6, and are released from interference with the hole edges of the engagement holes 7, so that the locking protrusions 31a engage with the hole edges of the engagement hole 7 on the back side of the fixing plate 6 by elastic restoration forces of the arms 31b. Accordingly, the electrical connection box 10B can be easily fixed to the fixing plate. With the fixing, the first ground contact portions 38 on the engagement hook 31 side are brought into contact with the first ground contact portions 8 provided on the hole walls of the engagement holes 7 of the fixing plate 6. Therefore, the ground circuit body 20 of the electrical connection box 10B is ground-connected via the second ground contact portions 38 and the first ground contact portions 8.

In this manner, the electrical connection box 10B can be fixed to the fixing plate 6 by simply inserting the engagement hooks 31 on the electrical connection box 10B side into the engagement holes 7 of the fixing plate 6 without using a bolt or the like. Moreover, simultaneously with the fixing, the second ground contact portions 38 can be reliably brought into contact and conducted with the first ground contact portions 8 while using the elastic forces of the engagement hooks 31. Therefore, since a bolt or the like is not used, the fixing and the ground connection of the electrical connection box 10B can be easily completed, and it is particularly advantageous to apply to a small electrical connection box.

Third Embodiment

Figure 5:
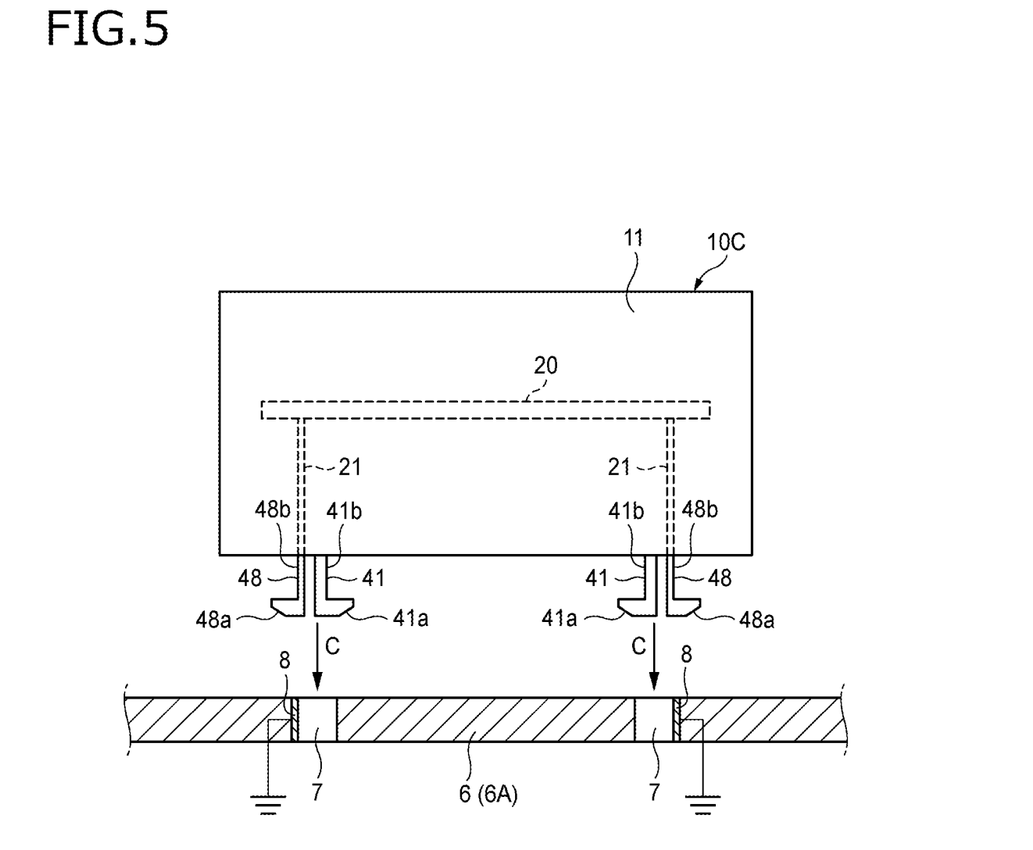
FIG. 5 is a side sectional view showing a state before a ground connection structure of an electrical connection box according to a third embodiment of the present invention is fixed.

FIG. 5 is a side sectional view showing a state before a ground connection structure of an electrical connection box according to a third embodiment of the present invention is fixed.

As shown in FIG. 5, in the ground connection structure of the electrical connection box according to the third embodiment, as in the second embodiment, an electrical connection box 10C is not fixed by a bolt, but is fixed by engagement hooks 41, 48. In addition, the fixation object is not the vehicle body made of metal but is the fixing plate 6 made of resin. Therefore, the electrical connection box 10C is not provided with the fixing bracket.

In the present embodiment, a fixing member of the electrical connection box 10C is configured by a combination of the engagement holes 7 formed through the fixed position 6A of the fixing plate 6 and the engagement hooks 41, 48 elastically engaged with the engagement holes 7 by being inserted into the engagement holes 7.

In particular, as the flexible engagement hooks 41, 48, two engagement hooks 41, 48, which are respectively made of resin and metal, inserted into the same engagement hole 7 are provided in pairs in parallel with each other. The engagement hook 41 made of resin is integrally protruded on the lower surface of the electrical connection box main body 11. In addition, the engagement hook 48 made of metal is protruded on the lower surface of the electrical connection box main body 11 in a state of being connected to the connection conductor 21.

The engagement hook 41 made of resin and the engagement hook 48 made of metal include, on ends of deflectable arms 41b, 48b, locking protrusions 41a, 48a protruding respectively on side surfaces opposite to the opposed sides of arms 41b, 48b in bending directions which are directions orthogonal to the insertion directions C with respect to the engagement holes 7. The engagement hooks 41, 48 are inserted into the engagement holes 7 so that the locking protrusions 41a, 48a are respectively engaged with the hole edges of the engagement holes 7 by elastic restoration actions of the engagement hooks 41, 48.

Each of the engagement hooks 48 made of metal itself is configured as the second ground contact portion, and is configured to be brought into contact and conducted to the first ground contact portion 8 provided on the hole wall of the engagement hole 7 on the fixing plate 6 side.

In order to fix the electrical connection box 10C to the fixing plate 6, as shown by arrows C in FIG. 5, the engagement hooks 41, 48 on the bottom surface of the electrical connection box 10C are inserted into the engagement holes 7 of the fixing plate 6. The two adjacent engagement hooks 41, 48 made of resin and metal are inserted into the same engagement hole 7.

Then, as the insertion proceeds, the tip ends of the engagement hooks 41, 48 interfere with the hole edges of the engagement holes 7, so that the arms 41b, 48b of the engagement hooks 41, 48 are bent on the sides opposite to the protruding directions of the locking protrusions 41a, 48a. When the engagement hooks 41, 48 are further inserted, the locking protrusions 41a, 48a come off the back side of the fixing plate 6, and are released from the interference with the hole edges of the engagement holes 7, so that the locking protrusions 41a, 48a engage with the hole edges of the engagement holes 7 on the back side of the fixing plate 6 by elastic restoration forces of the arms 41b 48b. Accordingly, the electrical connection box 10C can be easily fixed to the fixing plate 6. By the fixing, the engagement hooks 48 (first ground contact portion) made of metal are brought into contact and conducted with the first ground contact portions 8 provided on the hole walls of the engagement holes 7 of the fixing plate 6. Therefore, the ground circuit body 20 of the electrical connection box 10C is ground-connected via the engagement hooks 48 made of metal and the first ground contact portions 8.

The electrical connection box 10C can be fixed to the fixing plate 6 by simply inserting the engagement hooks 41, 48 on an electrical connection box 10C side into the engagement holes 7 of the fixing plate 6 without using a bolt or the like. Moreover, simultaneously with the fixing, the engagement hooks 48 made of metal as the second ground contact portion can be reliably brought into contact and conducted with the first ground contact portions 8 while using elastic forces of the engagement hooks 41, 48. Therefore, since a bolt or the like is not used, the fixing and the ground connection of the electrical connection box 10C can be easily completed, and it is particularly advantageous to apply to a small electrical connection box.

In this case, since the locking protrusions 41a, 48a of the two engagement hooks 41, 48 are engaged with the opposing hole edges of the engagement holes 7 of the fixing plate 6, the electrical connection box 10C can be firmly fixed to the fixing plate 6 without a backlash.

Simultaneously with the fixing, the side surfaces (second ground contact portion) of the engagement hooks 48 made of metal can be reliably brought into contact and conducted with the first ground contact portions 8 while using the two elastic forces of the engagement hooks 48 made of metal and the engagement hooks 41 made of resin.

Here, characteristics of the ground connection structure of the electrical connection box and the electrical connection box according to the embodiments of the present invention are briefly summarized in following [1] to [9], respectively.

[1] A ground connection structure of an electrical connection box (10A, 10B, 10C) and a fixation object (1, 6), the ground connection structure including:
  a first ground contact portion (1A, 8) provided on the fixation object (1, 6);
  a second ground contact portion (22, 38, 48) provided on the electrical connection box (10A 10B, 10C) and electrically connected to the first ground contact portion (1A, 8) when the electrical connection box (10A, 10B 10C) is fixed to the fixation object (1, 6);
  a ground circuit body (20) provided in the electrical connection box (10A, 10B, 10C) and electrically connected to the second ground contact portion (22, 38, 48); and
  a fixing member (2, 4, 12, 31, 41, 48) configured to fix the electrical connection box (10A, 10B, 10C) to the fixation object (1, 6) such that the second ground contact portion (22, 38, 48) is brought into contact with the first ground contact portion (1A, 8).

[2] The ground connection structure according to the above [1],
  wherein the fixation object is a vehicle body (1) made of metal, and a surface (1A) of the vehicle body is the first ground contact portion (1A); and
  wherein the second ground contact portion (22) has a flat plate shape and is in surface contact with the surface (1A) of the vehicle body.

[3] The ground connection structure according to the above [2],
  wherein a plurality of protrusions (22a) are provided on a contact surface of the second ground contact portion (22) configured to be in surface contact with the first ground contact portion (1A).

[4] The ground connection structure according to any one of the above [1] to [3], further including:
  an elastic member configured to press into contact the second ground contact portion (22) with the first ground contact portion by an elastic force of the elastic member.

[5] The ground connection structure according to the above [1],
  wherein the fixing member includes:
    an engagement hole (7) formed through a fixing plate (6) of the fixation object; and
    a flexible engagement hook (31) of the electrical connection box elastically engaged with the engagement hole (7) when the flexible engagement hook (31) is inserted into the engagement hole (7);
  wherein the engagement hook (31) includes:
    a deflectable arm (31b); and
    a locking protrusion (31a) provided on an end of the deflectable arm (31b) and protruding toward a side surface of the arm (31b) in a bending direction (D) of the deflectable arm (31b) which is orthogonal to an insertion direction (C) of the flexible engagement hook (31) with respect to the engagement hole (7) when the engagement hook (31) is inserted into the engagement hole (7), the locking protrusion (31a) being engaged with a hole edge of the engagement hole (7) by an elastic restoration action of the engagement hook (31);
  wherein the first ground contact portion (8) is provided on a hole wall of the engagement hole (7) which is engaged with the locking protrusion (31a); and wherein the second ground contact portion (38) is provided on a side surface of the arm (31b) of the engagement hook (31) which faces in a protruding direction of the locking protrusion (31a).

[6] The ground connection structure according to the above [1],
wherein the fixing member includes:
an engagement hole (7) formed through a fixing plate (6) of the fixation object; and
a flexible engagement hook (41, 48) of the electrical connection box elastically engaged with the engagement hole (7) when the flexible engagement hook (41, 48) is inserted into the engagement hole (7);
wherein the engagement hook has a first engagement hook portion (48) made of metal and a second engagement hook portion (41) made of resin which are inserted into the engagement hole (7) and are provided parallel to each other;
wherein locking protrusions are provided on ends of deflectable arms of the first engagement hook portion (48) and the second engagement hook portion (41) respectively, the locking protrusions (48a, 41a) protrude respectively in directions opposite to the opposed sides of the arms in bending directions of the first engagement hook portion (48) and the second engagement hook portion (41) which are orthogonal to an insertion direction (C) of the first engagement hook portion (48) and the second engagement hook portion (41) with respect to the engagement hole (7), and when the first engagement hook portion (48) and the second engagement hook portion (41) are inserted into the engagement hole (7), the locking protrusions (48a, 41a) are engaged with opposing hole edges of the engagement hole (7) by elastic restoration actions of the first engagement hook portion (48) and the second engagement hook portion (41); and
wherein a side surface of the first engagement hook portion (48) is electrically connected to the first ground contact portion (8) provided on a hole wall of the engagement hole (7) of a fixing plate as the second ground contact portion.

[7] An electrical connection box including:
a second ground contact portion (22) configured to be electrically connected to a first ground contact portion (1A) provided on a fixation object (1);
a ground circuit body (20) electrically connected to the second ground contact portion (22); and
a fixing member configured to fix the electrical connection box to the fixation object (1) such that the second ground contact portion (22) is brought into contact with the first ground contact portion (1A);
wherein the second ground contact portion (22) has a flat plate shape and is in surface contact with the first ground contact portion (1A); and
wherein a plurality of protrusions (22a) are provided on a contact surface of the second ground contact portion which is in surface contact with the first ground contact portion.

[8] An electrical connection box including:
a second ground contact portion (38) configured to be electrically connected to a first ground contact portion provided on a fixation object;
a ground circuit body (20) electrically connected to the second ground contact portion (38); and
a fixing member (31) configured to fix the electrical connection box to the fixation object such that the second ground contact portion (38) is brought into contact with the first ground contact portion,
wherein the fixing member has a flexible engagement hook (31) which is inserted into the engagement hole of a fixing plate of the fixation object and is elastically engaged with the engagement hole;
wherein the engagement hook (31) includes:
a deflectable arm (31b); and
a locking protrusion (31a) provided on an end of the deflectable arm and protruding toward a side surface of the arm (31b) in a bending direction (D) of the deflectable arm which is orthogonal to an insertion direction (C) of the flexible engagement hook with respect to the engagement hole (7); and
wherein the second ground contact portion (38) is provided on a side surface of the arm (31b) of the engagement hook (31) which faces in a protruding direction of the locking protrusion (31a).

[9] An electrical connection box including:
a second ground contact portion (48) configured to be electrically connected to a first ground contact portion provided on a fixation object;
a ground circuit body (20) electrically connected to the second ground contact portion (48); and
a fixing member (41, 48) configured to fix the electrical connection box to the fixation object such that the second ground contact portion (48) is brought into contact with the first ground contact portion,
wherein the fixing member has a flexible engagement hook (41, 48) which is inserted into an engagement hole of a fixing plate of the fixation object and which is elastically engaged with the engagement hole;
wherein the engagement hook (41, 48) has a first engagement hook portion (48) made of metal and a second engagement hook portion (41) made of resin which are inserted into the engagement hole and are provided parallel to each other;
wherein locking protrusions are provided on ends of deflectable arms of the first engagement hook portion (48) and the second engagement hook portion (41) respectively, the locking protrusions protrude respectively in directions opposite to the opposed sides of the arms in bending directions of the arms of the first and second engagement hook portions (48, 41); and
wherein a side surface of the first engagement hook portion (48) in the bending direction serves as the second ground contact portion and is electrically connected to the first ground contact portion.

What is claimed is:
1. A ground connection structure of an electrical connection box and a fixation object, the ground connection structure comprising:
a first ground contact portion provided on the fixation object;
a second ground contact portion provided on the electrical connection box and electrically connected to the first ground contact portion when the electrical connection box is fixed to the fixation object;
a ground circuit body provided in the electrical connection box and electrically connected to the second ground contact portion; and
a fixing member configured to fix the electrical connection box to the fixation object such that the second ground contact portion is brought into contact with the first ground contact portion, wherein the fixing member includes:
an engagement hole formed through a fixing plate of the fixation object; and
a flexible engagement hook of the electrical connection box elastically engaged with the engagement hole when the flexible engagement hook is inserted into the engagement hole;
wherein the engagement hook includes:
a deflectable arm; and
a locking protrusion provided on an end of the deflectable arm and protruding toward a side surface of the arm in a bending direction of the deflectable arm which is orthogonal to an insertion direction of the flexible engagement hook with respect to the engagement hole when the engagement hook is inserted into the engagement hole, the locking protrusion being engaged with a hole edge of the engagement hole by an elastic restoration action of the engagement hook;
wherein the first ground contact portion is provided on a hole wall of the engagement hole which is engaged with the locking protrusion; and
wherein the second ground contact portion is provided on a side surface of the arm of the engagement hook which faces in a protruding direction of the locking protrusion.

2. The ground connection structure according to claim 1, wherein the fixation object is a vehicle body made of metal, and a surface of the vehicle body is the first ground contact portion; and
wherein the second ground contact portion has a flat plate shape and is in surface contact with the surface of the vehicle body.

3. The ground connection structure according to claim 2, wherein a plurality of protrusions are provided on a contact surface of the second ground contact portion configured to be in surface contact with the first ground contact portion.

4. The ground connection structure according to claim 1, further comprising:
an elastic member configured to press into contact the second ground contact portion with the first ground contact portion by an elastic force of the elastic member.

5. A ground connection structure of an electrical connection box and a fixation object, the ground connection structure comprising:
a first ground contact portion provided on the fixation object;
a second ground contact portion provided on the electrical connection box and electrically connected to the first ground contact portion when the electrical connection box is fixed to the fixation object;
a ground circuit body provided in the electrical connection box and electrically connected to the second ground contact portion; and
a fixing member configured to fix the electrical connection box to the fixation object such that the second ground contact portion is brought into contact with the first ground contact portion,
wherein the fixing member includes:
an engagement hole formed through a fixing plate of the fixation object; and
a flexible engagement hook of the electrical connection box elastically engaged with the engagement hole when the flexible engagement hook is inserted into the engagement hole; and wherein the engagement hook has a first engagement hook portion made of metal and a second engagement hook portion made of resin which are inserted into the engagement hole and are provided parallel to each other;
wherein locking protrusions are provided on ends of deflectable arms of the first engagement hook portion and the second engagement hook portion respectively, the locking protrusions protrude respectively in directions opposite to the opposed sides of the arms in bending directions of the arms of the first and second engagement hook portions which are orthogonal to an insertion direction of the first and second engagement hook portions with respect to the engagement hole, and when the first and second engagement hook portions are inserted into the engagement hole, the locking protrusions are engaged with opposing hole edges of the engagement hole by elastic restoration actions of the first and second engagement hook portions; and
wherein a side surface of the first engagement hook portion is electrically connected to the first ground contact portion provided on a hole wall of the engagement hole of a fixing plate as the second ground contact portion.

6. An electrical connection box comprising:
a second ground contact portion configured to be electrically connected to a first ground contact portion provided on a fixation object;
a ground circuit body electrically connected to the second ground contact portion; and
a fixing member configured to fix the electrical connection box to the fixation object such that the second ground contact portion is brought into contact with the first ground contact portion,
wherein the second ground contact portion has a flat plate shape and is in surface contact with the first ground contact portion; and
wherein a plurality of protrusions are provided on a contact surface of the second ground contact portion which is in surface contact with the first ground contact portion.

7. An electrical connection box comprising:
a second ground contact portion configured to be electrically connected to a first ground contact portion provided on a fixation object;
a ground circuit body electrically connected to the second ground contact portion; and
a fixing member configured to fix the electrical connection box to the fixation object such that the second ground contact portion is brought into contact with the first ground contact portion,
wherein the fixing member has a flexible engagement hook which is inserted into the engagement hole of a fixing plate of the fixation object and is elastically engaged with the engagement hole;
wherein the engagement hook includes:
a deflectable arm; and
a locking protrusion provided on an end of the deflectable arm and protruding toward a side surface of the arm in a bending direction of the deflectable arm which is orthogonal to an insertion direction of the flexible engagement hook with respect to the engagement hole; and
wherein the second ground contact portion is provided on a side surface of the arm of the engagement hook which faces in a protruding direction of the locking protrusion.

8. An electrical connection box comprising:
a second ground contact portion configured to be electrically connected to a first ground contact portion provided on a fixation object;
a ground circuit body electrically connected to the second ground contact portion; and
a fixing member configured to fix the electrical connection box to the fixation object such that the second ground contact portion is brought into contact with the first ground contact portion,
wherein the fixing member has a flexible engagement hook which is inserted into an engagement hole of a fixing plate of the fixation object and which is elastically engaged with the engagement hole;
wherein the engagement hook has a first engagement hook portion made of metal and a second engagement hook portion made of resin which are inserted into the engagement hole and are provided parallel to each other;
wherein locking protrusions are provided on ends of deflectable arms of the first engagement hook portion and the second engagement hook portion respectively, the locking protrusions protrude respectively in directions opposite to the opposed sides of the arms in bending directions of the arms of the first and second engagement hook portions; and
wherein a side surface of the first engagement hook portion in the bending direction serves as the second ground contact portion and is electrically connected to the first ground contact portion.

* * * * *